(12) United States Patent
Tran

(10) Patent No.: US 11,673,319 B2
(45) Date of Patent: Jun. 13, 2023

(54) THREE-DIMENSIONAL PRINTING SYSTEM WITH IMPROVED OPTICAL PATH

(71) Applicant: 3D Systems, Inc., Rock Hill, SC (US)

(72) Inventor: Hai Quang Tran, Rock Hill, SC (US)

(73) Assignee: 3D SYSTEMS, INC., Rock Hill, SC (US)

(*) Notice: Subject to any disclaimer, the term of this patent is extended or adjusted under 35 U.S.C. 154(b) by 370 days.

(21) Appl. No.: 17/097,242

(22) Filed: Nov. 13, 2020

(65) Prior Publication Data

US 2021/0146611 A1 May 20, 2021

Related U.S. Application Data

(60) Provisional application No. 62/935,161, filed on Nov. 14, 2019.

(51) Int. Cl.
| | |
|---|---|
| *B29C 64/129* | (2017.01) |
| *B29C 64/255* | (2017.01) |
| *B29C 64/245* | (2017.01) |
| *B29C 64/264* | (2017.01) |
| *B29C 64/232* | (2017.01) |
| *B33Y 30/00* | (2015.01) |
| *B33Y 10/00* | (2015.01) |

(52) U.S. Cl.
CPC .......... *B29C 64/129* (2017.08); *B29C 64/232* (2017.08); *B29C 64/245* (2017.08); *B29C 64/255* (2017.08); *B29C 64/264* (2017.08); *B33Y 10/00* (2014.12); *B33Y 30/00* (2014.12)

(58) Field of Classification Search
CPC ... B29C 64/129; B29C 64/232; B29C 64/245; B29C 64/255; B29C 64/264; B33Y 10/00; B33Y 30/00
See application file for complete search history.

(56) References Cited

U.S. PATENT DOCUMENTS

| | | | |
|---|---|---|---|
| 2015/0142160 A1* | 5/2015 | Ohnishi | B29C 64/141 700/119 |
| 2016/0288421 A1* | 10/2016 | Costabeber | B33Y 40/00 |
| 2017/0106591 A1* | 4/2017 | Tabayashi | B33Y 10/00 |
| 2018/0186066 A1* | 7/2018 | Cooper | G01M 11/00 |

* cited by examiner

*Primary Examiner* — Michael M. Robinson

(57) ABSTRACT

A three-dimensional printing system includes a resin vessel, a support plate, a light engine, a build tray, motorized support, and a controller. The resin vessel includes a vessel body defining a central opening and a transparent sheet that closes the central opening. The transparent sheet is at least partially formed from a cast polypropylene (CPP). The support plate is for supporting the resin vessel and includes a rigid transparent central portion for supporting the transparent sheet. The light engine is configured to project pixelated light to a build plane within the resin. The build tray defines a support surface for supporting the three-dimensional article to be at least partially submerged in the resin. The motorized support is configured to align and adjust a vertical position of the build tray. The controller is for controlling the light engine and the motorized support for fabricating the three-dimensional article.

16 Claims, 3 Drawing Sheets

THREE-DIMENSIONAL PRINTING SYSTEM WITH IMPROVED OPTICAL PATH

CROSS-REFERENCE TO RELATED APPLICATIONS

This non-provisional patent application claims priority to U.S. Provisional Application Ser. No. 62/935,161, Entitled "Three-Dimensional Printing System with Improved Optical Path" by Hai Quang Tran, filed on Nov. 14, 2019, incorporated herein by reference under the benefit of U.S.C. 119(e).

FIELD OF THE INVENTION

The present disclosure concerns an apparatus for fabrication of solid three-dimensional articles from radiation curable (photocurable) resins in a layer-by-layer manner. More particularly, the present disclosure concerns an advantageous material solution for an optical path for such an apparatus.

BACKGROUND

Three dimensional (3D) printers are in rapidly increasing use. One class of 3D printers includes stereolithography printers having a general principle of operation including the selective curing and hardening of radiation curable (photocurable) liquid resins. A typical stereolithography system includes a resin vessel holding the photocurable resin, a movement mechanism coupled to a support tray, and a controllable light engine. The stereolithography system forms a three dimensional (3D) article of manufacture by selectively curing layers of the photocurable resin onto a surface of the support tray. Each selectively cured layer is formed at a "build plane" within the resin.

One variant of this type of system defines a build plane between a lower face of the support tray and a flexible, transparent sheet. One challenge with such a system is to find materials for the transparent sheet. Nearly all potential polymers for such a transparent sheet fail in some way. Some are damaged quickly by the resin. Others are "fouled" by a hardening of resin upon the transparent sheet. Yet others don't have a necessary optical clarity for blue, violet, and/or ultraviolet light that enables for the formation of precision articles of manufacture.

SUMMARY

Figure 1:
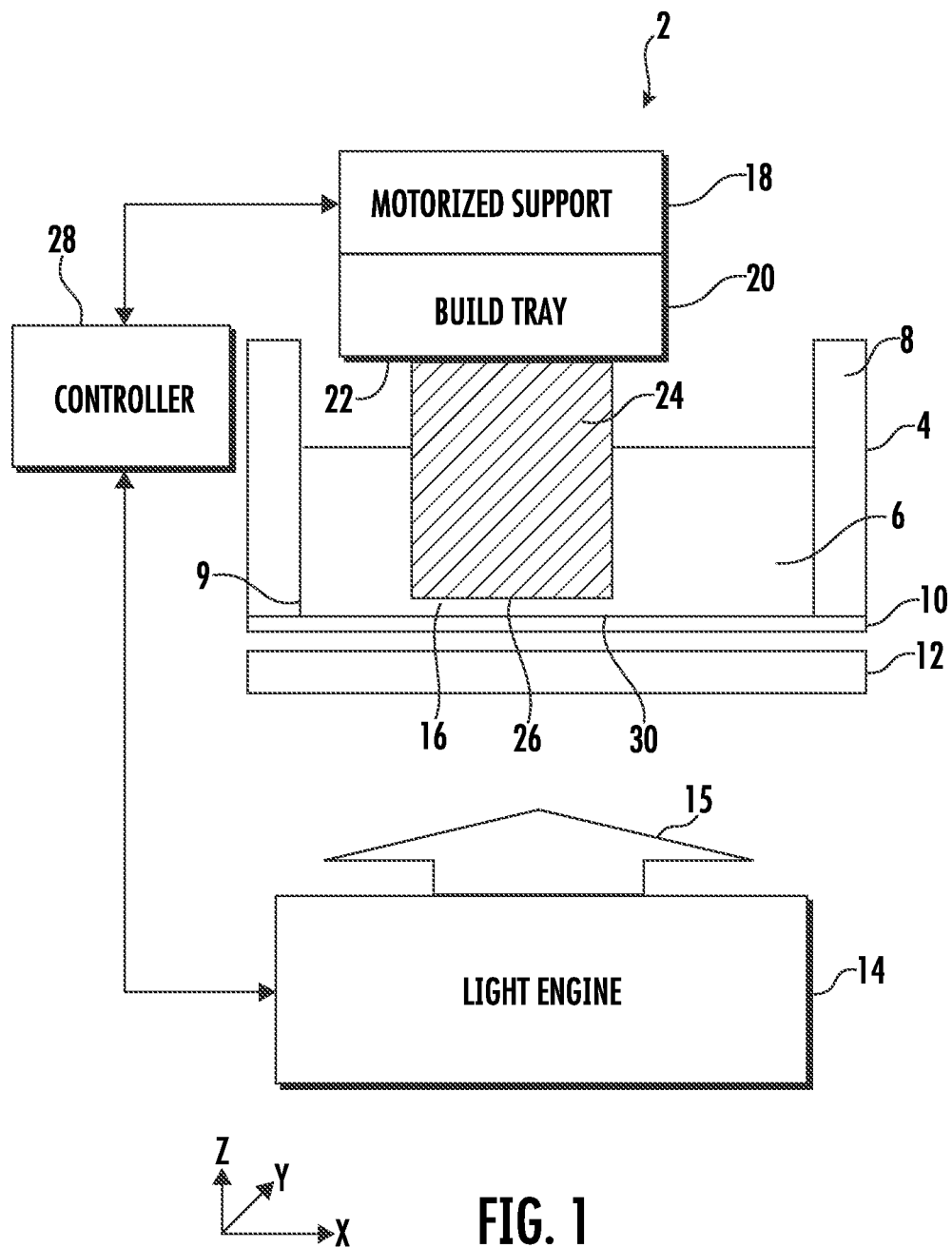
FIG. 1 is a schematic diagram of an embodiment of a three-dimensional printing system 2.

In an aspect of the disclosure, a three-dimensional printing system includes a resin vessel, a support plate, a light engine, a build tray, motorized support, and a controller. The resin vessel includes a vessel body defining a central opening and a transparent sheet that closes the central opening. The transparent sheet is at least partially formed from a cast polypropylene (CPP). The support plate is for supporting the resin vessel and includes a rigid transparent central portion (transparent plate) for supporting the transparent sheet. The light engine is configured to project pixelated light through the rigid transparent central portion of the support plate and through the transparent sheet and to a build plane within the resin. The build tray defines a support surface for supporting the three-dimensional article to be at least partially submerged in the resin. The motorized support is configured to align and adjust a vertical position of the build tray. The controller is for controlling the light engine and the motorized support for fabricating the three-dimensional article.

In one implementation, the transparent sheet is a single layer of CPP. In some embodiments a thickness can vary from about 25 microns (1000 microns equals a millimeter) to about 200 microns. More particularly, a thickness can vary from about 50 microns to about 150 microns. Yet more particularly, thicknesses of about 50 microns, 100 microns, 150 microns, or 200 microns may be suitable for certain systems. For other systems, a thickness of greater than 200 microns may be suitable.

In another implementation, the transparent sheet is a multilayer film including at least one layer of CPP and at least one layer that is not CPP. The layer that is not CPP can be silicone. The layers can include a thick layer of silicone with one or two layers of CPP. Other multilayer structures and materials in combination with CPP may be possible.

In yet another implementation, the support plate includes a plate body that defines a central opening closed by a rigid transparent plate. The rigid transparent plate includes the rigid transparent central portion of the support plate. The plate body can be formed form metal.

Finding a material for such a transparent sheet has been an arduous task due to an existence of thousands of potential choices most of which do not meet key requirements. Requirements have included optical clarity for blue, violet, and/or ultraviolet radiation, dimensional stability, dimensional accuracy, inhibitor permeability and material compatibility with the photocurable resin to name some of the requirements. Large past efforts to find suitable materials have yielded few results and they have always had substantial compromise. Some films have high optical clarity but lack a required oxygen permeability. Some films are rigid and dimensionally accurate, but will tend to burst if slightly punctured. Some of these films are also extremely expensive and replacement is not always done even with some damage that impairs optical accuracy. CPP in combination with an underlying transparent plate meets all the key requirements including a low cost and a large elongation at break. This prevents catastrophic failure of the film but at the same time allows for an inexpensive replacement for minor damage. The result is unique in terms of cost, reliability, and dimensional accuracy for articles being fabricated.

DETAILED DESCRIPTION OF THE PREFERRED EMBODIMENTS

FIG. 1 is a schematic diagram of an embodiment of a three-dimensional printing system 2. In describing system 2, axes X, Y, and Z can be used. Axes X and Y are generally horizontal and axis Z is generally vertical and generally aligned with a gravitational reference. As discussed herein, the term "generally" refers to having a dimension, an angle, or other parameter that is within manufacturing or placement tolerances.

Printing system 2 includes a resin vessel 4 for containing photocurable resin 6. Resin vessel 4 includes a vessel body 8 that defines a central opening 9. The central opening 9 is closed by a transparent sheet 10.

The transparent sheet 10 is formed from an optically clear material that has a permeability to a reaction inhibitor such as oxygen (from ambient air or from another oxygen source). The transparent sheet is at least partially formed from a cast polypropylene (CPP). The transparent sheet can be a single layer of CPP or a multilayer film including one or more layers of CPP and one or more layers of material that is not CPP.

The resin vessel 4 is supported by a support plate 12. The support plate 12 includes a central transparent opening and/or plate (to be shown in subsequent figures) that is laterally aligned with the transparent sheet 10. A light engine 14 is configured to project pixelated light 15 up through the support plate 12, through the transparent sheet 10, and to a build plane 16 within the resin 6. The build plane 16 is a lateral region of the resin 6 that can be imaged by the light engine 14.

A motorized support 18 is configured to vertically position a build tray 20. Build tray 20 has a surface 22 for supporting a three-dimensional article 24 being fabricated by system 2. The three-dimensional article 24 has a distal surface 26 that is in facing relation with the transparent sheet 10 and is proximate to the build plane 16.

A controller 28 is coupled to the light engine 14 and the motorized support 18. Controller 28 includes a processor coupled to an information storage device. The information storage device includes a nonvolatile or non-transient storage device storing software instructions. When the software instructions are executed by the processor, they operate the light engine 14 and motorized support and perform the following steps: (1) Operate the motorized support 18 to position surface 22 (or afterwards surface 26) at build plane 16. (2) Operate light engine 14 to selectively solidify a layer of resin onto surface 22 or 26. (3) Repeat (1) and (2) to complete fabrication of the three-dimensional article 24.

As material is being solidified onto surface 22 or 26, there is a inhibited zone 30 of resin immediately adjacent the transparent sheet 10 that does not polymerize. That is because an inhibitor such as oxygen diffuses through the transparent sheet 10 and to the inhibited zone 30.

The support plate 12 provides a rigid or fluid-driven support for the transparent sheet 10. This assures that the transparent sheet 10 maintains a very planar or predictable geometry which in turn provides a very accurate optical path between the light engine 14 and the resin 6 being cured at build plane 16. Sometimes particles can fall from article 24 during fabrication and can be sandwiched between the distal surface 26 and the transparent sheet 10. For some prior transparent sheet materials, such particles can damage or catastrophically puncture the sheet 10. With the use of CPP the sheet 10 has a very high elongation at break, preventing such a catastrophic puncture. But unlike many materials with such a high elongation, the CPP also has high optical clarity to blue, violet, and ultraviolet light and, at the same time, is chemically resistant to exposure to the photocurable resin 6. All of the combined attributes make CPP a very unique material among polymers that can be used for the transparent sheet 10.

Figure 2:
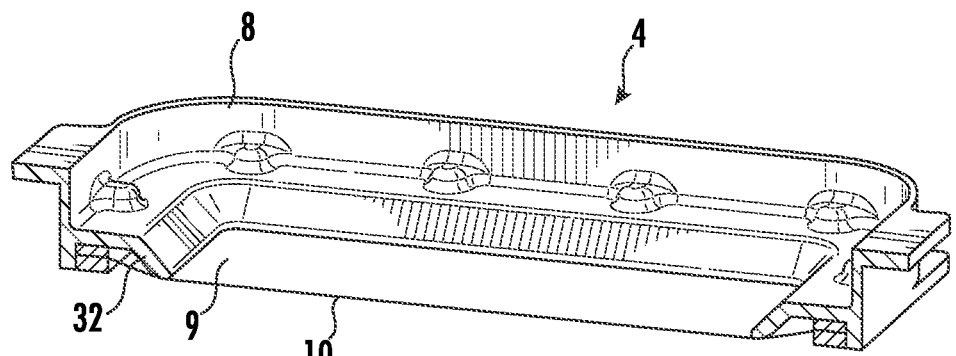
FIG. 2 is an isometric cutaway view of a portion of an embodiment of a resin vessel.

FIG. 2 is an isometric cutaway view of a portion of an embodiment of a resin vessel 4. Resin vessel 4 includes vessel body 8 that defines central opening 9 which is closed by the transparent sheet 10. Vessel body 8 also includes a tension ring 32 that tensions the transparent sheet 10. The tensioning improves planarity of the transparent sheet 10.

Figure 3:
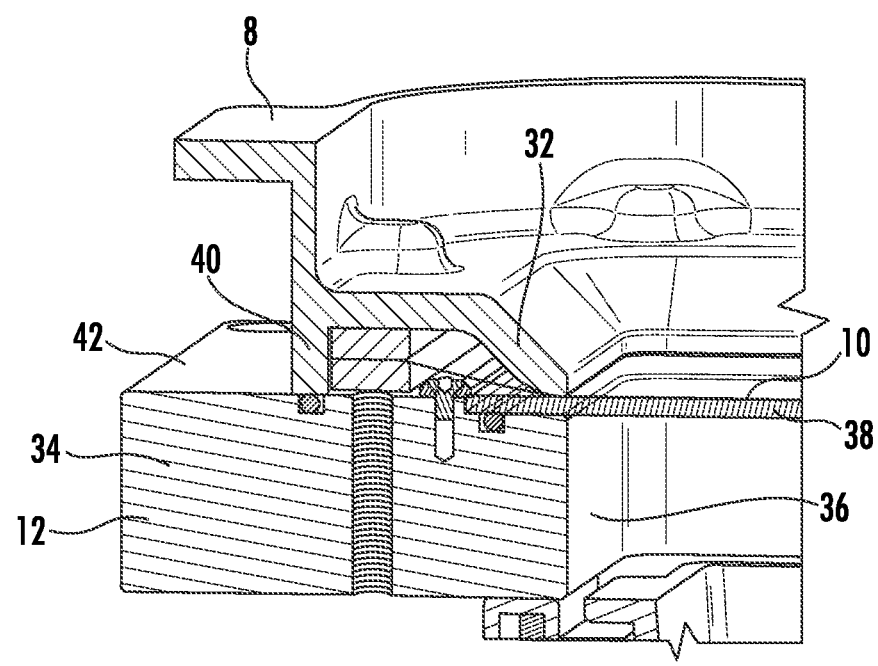
FIG. 3 is an isometric cutaway view of a portion of a resin vessel supported by a support plate.

FIG. 3 is an isometric cutaway view of a portion of the resin vessel supported by the support plate 12. The support plate 12 includes a plate body 34 that defines an central opening 36. The central opening 36 is closed by a rigid transparent plate 38. The rigid transparent plate 38 can be made of glass, and provides support for the transparent sheet 10. The support can include a direct contact between the transparent plate 38 and the transparent sheet 10. Alternatively, support can include a pressurized gas between the transparent plate 38 and the transparent sheet 10.

The vessel body 8 includes a lower ring 40 that rests upon an upper surface 42 of the plate body 34. Other embodiments of resin vessel 4 and support plate 12 are possible.

Figure 4A:
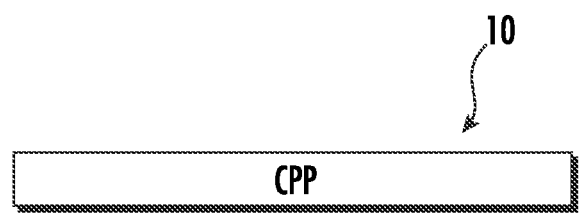
FIG. 4A is a first embodiment of a portion of a transparent sheet.
Figure 4B:
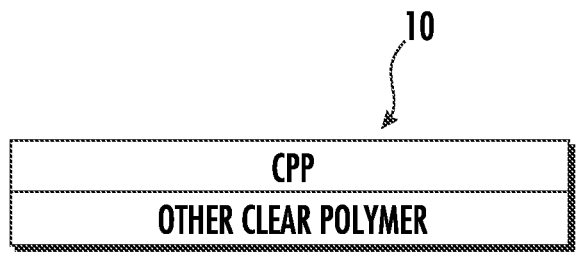
FIG. 4B is a second embodiment of a portion of a transparent sheet.

FIGS. 4A and 4B are cross sectional views of a portion of two different embodiments of the transparent sheet 10. The transparent sheet 10 of FIG. 4A is a single layer of CPP.

The embodiment of FIG. 4B is a multilayer film. The transparent sheet 10 of FIG. 4B has a relatively thick layer of silicone and a relatively thin layer of CPP. The CPP can be in contact with the resin 6 due to its better material resistance to the resin 6 for some resins. The silicone may have better transmissivity for the inhibitor or other advantages.

The specific embodiments and applications thereof described above are for illustrative purposes only and do not preclude modifications and variations encompassed by the scope of the following claims.

What is claimed:

1. A three-dimensional printing system for fabricating a three-dimensional article comprising:
   a resin vessel for containing resin and including:
      a vessel body defining a central opening; and
      a transparent sheet that closes the central opening, the transparent sheet at least partially formed from a cast polypropylene (CPP) film;
   a support plate for supporting the resin vessel;
   a light engine configured to project pixelated light through the rigid transparent central portion of the support plate and through the transparent sheet and to a build plane within the resin;
   a build tray defining a support surface for supporting the three-dimensional article to be at least partially submerged in the resin;
   a motorized support configured to align and adjust a vertical position of the build tray; and
   a controller for controlling the light engine and the motorized support for fabricating the three-dimensional article,
   wherein the transparent sheet is a multilayer film including CPP and at least one other polymer layer that is not CPP.

2. The three-dimensional printing system of claim 1 wherein the support plate includes a plate body that defines a central opening closed by a rigid transparent plate, the rigid transparent plate includes a rigid transparent central portion of the support plate for supporting the transparent sheet.

3. The three-dimensional printing system of claim 1 wherein the controller is configured to:
   (1) operate the motorized support to position a lower surface of the build tray or the three-dimensional article at the build plane;
   (2) operate light engine to selectively solidify a layer of resin onto the lower surface of the build tray or the three-dimensional article;
   (3) repeat (1) and (2) to complete fabrication of the three-dimensional article.

4. The three-dimensional printing system of claim 1 wherein the transparent sheet has a thickness within a range of 25 microns to 200 microns.

5. The three-dimensional printing system of claim 1 wherein the transparent sheet has a thickness within a range of 50 microns to 150 microns.

6. The three-dimensional printing system of claim 1 wherein the at least one other polymer layer that is not CPP includes silicone.

7. The three-dimensional printing system of claim 1 wherein transparent sheet includes at least one layer of silicone and two layers of CPP.

8. A method of manufacturing a three-dimensional article comprising:
 providing a three-dimensional printing system including:
  a resin vessel for containing resin and including:
   a vessel body defining a central opening; and
   a transparent sheet that closes the central opening, the transparent sheet at least partially formed from a cast polypropylene (CPP) film;
  a support plate for supporting the resin vessel;
  a light engine configured to project pixelated light through the rigid transparent central portion of the support plate and through the transparent sheet and to a build plane within the resin;
  a build tray defining a support surface for supporting the three-dimensional article to be at least partially submerged in the resin; and
  a motorized support configured to align and adjust a vertical position of the build tray;
 operating the motorized support to position a lower surface of the build tray or the three-dimensional article at the build plane;
 operating the light engine to selectively solidify a layer of resin onto the lower surface of the build tray or the three-dimensional article; and
 repeating (1) and (2) to complete manufacture of the three-dimensional article;
 wherein the transparent sheet is a multilayer film including CPP and at least one other polymer layer that is not CPP.

9. The method of claim 8 wherein the support plate includes a plate body that defines a central opening closed by a rigid transparent plate, the rigid transparent plate includes a rigid transparent central portion of the support plate for supporting the transparent sheet.

10. The method of claim 8 wherein the transparent sheet has a thickness within a range of 25 microns to 200 microns.

11. The method of claim 8 wherein the transparent sheet has a thickness within a range of 50 microns to 150 microns.

12. The method of claim 8 wherein the at least one other polymer layer that is not CPP includes silicone.

13. The method of claim 8 wherein transparent sheet includes at least one layer of silicone and two layers of CPP.

14. A three-dimensional printing system for fabricating a three-dimensional article comprising:
 a resin vessel for containing resin and including:
  a vessel body defining a central opening that is closed by a rigid support plate; and
  a transparent sheet supported over the rigid support plate, the transparent sheet is a multilayer film including a cast polypropylene (CPP) layer and at least one other polymer layer, the transparent sheet having a thickness in a range of 25 microns to 200 microns;
 a support plate for supporting the resin vessel;
 a light engine configured to project pixelated light through the rigid transparent central portion of the support plate and through the transparent sheet and to a build plane within the resin;
 a build tray defining a support surface for supporting the three-dimensional article to be at least partially submerged in the resin;
 a motorized support configured to align and adjust a vertical position of the build tray; and
 a controller for controlling the light engine and the motorized support for fabricating the three-dimensional article.

15. The three-dimensional printing system of claim 14 wherein the at least one other polymer layer that is not CPP includes silicone.

16. The three-dimensional printing system of claim 14 wherein transparent sheet includes at least one layer of silicone and two layers of CPP.

* * * * *